Figure 7:
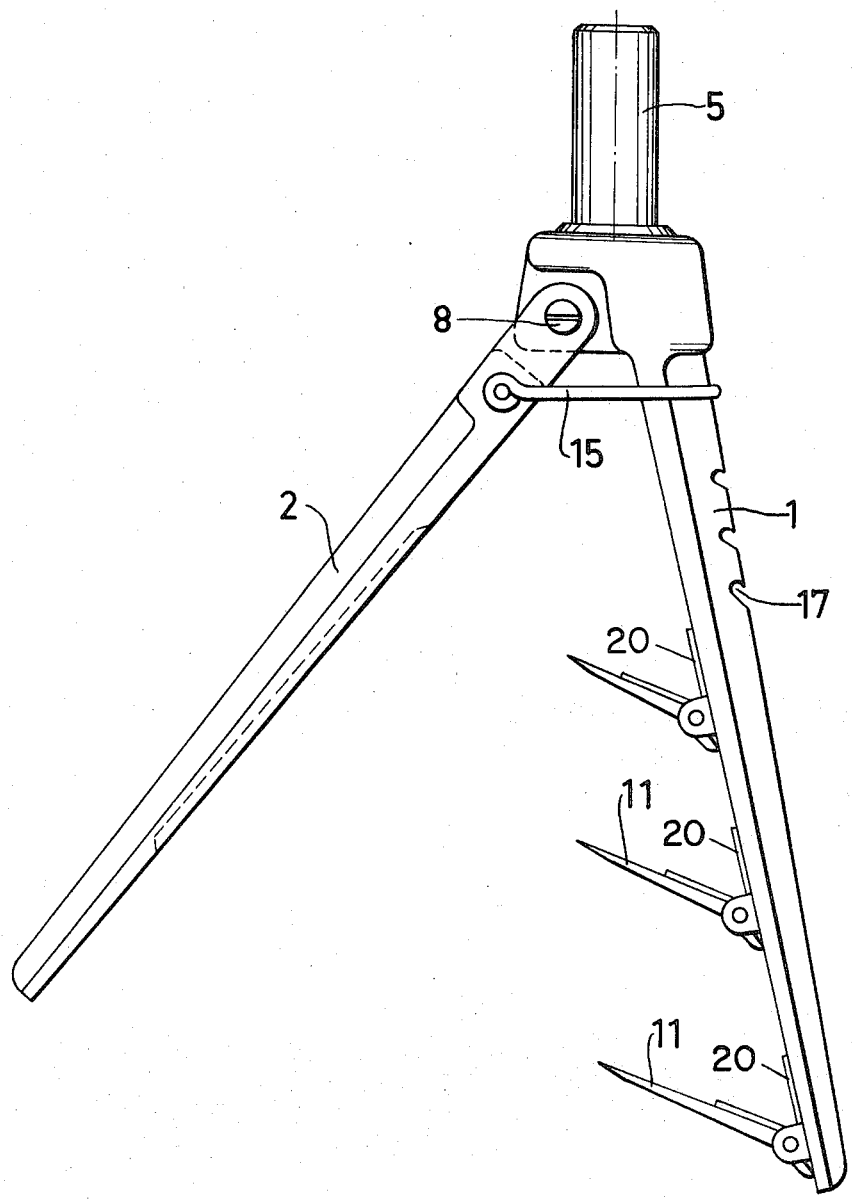

United States Patent [19]

Johansson

[11] 3,844,602
[45] Oct. 29, 1974

[54] DEVICE FOR TAKING CAUGHT FISH OUT OF THE WATER

[76] Inventor: Bengt Johansson, 79 Storforsvagen, Pitea, Sweden 94100

[22] Filed: Mar. 26, 1973

[21] Appl. No.: 344,542

[30] Foreign Application Priority Data
Oct. 27, 1972 Sweden.............................. 3937/72

[52] U.S. Cl..................... 294/110 A, 43/5, 294/104
[51] Int. Cl............................................ A01k 97/14
[58] Field of Search...... 294/19 R, 61, 66 R, 110 A, 294/103, 104, 106, 125, 126, 127; 43/5, 6

[56] References Cited
UNITED STATES PATENTS

| 477,178 | 6/1892 | Hall | 294/104 X |
|---|---|---|---|
| 1,415,995 | 5/1922 | Cooper | 294/100 X |
| 1,934,132 | 11/1933 | Lamb | 294/110 A |
| 2,263,965 | 11/1941 | Fiori | 294/99 R |
| 2,598,230 | 5/1952 | Dann | 294/61 X |
| 2,924,482 | 2/1960 | Gibson | 294/26 |

Primary Examiner—Evon C. Blunk
Assistant Examiner—Johnny D. Cherry
Attorney, Agent, or Firm—Pierce, Scheffler & Parker

[57] ABSTRACT

A device for gaffing and taking caught fish out of the water includes a fish holder adapted to be mounted onto the lower end of a shaft which is lowered into the water, the fish holder including a pair of legs one of which is mounted for pivotal movement towards and away from the other so that the caught fish can be placed between them. One or more spears are pivotally mounted on one of the legs and as the fish holder is drawn upwards, the spear or spears penetrate the fish which thereby becomes safely locked between the legs.

4 Claims, 7 Drawing Figures

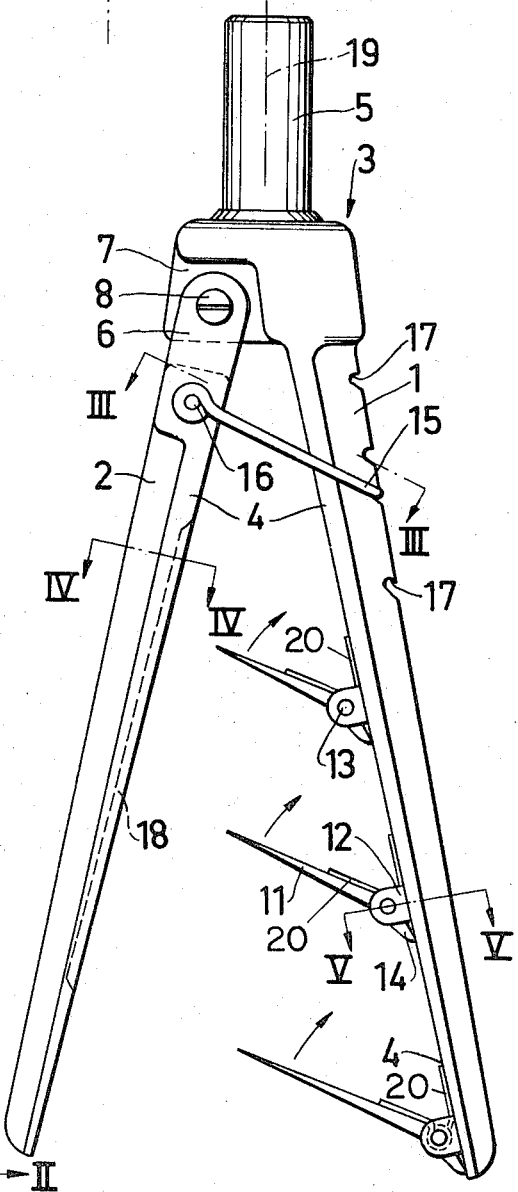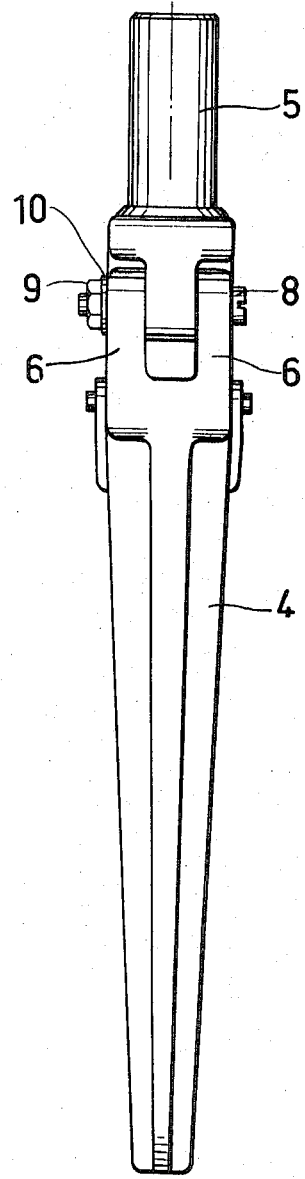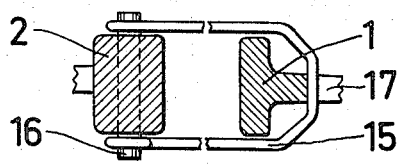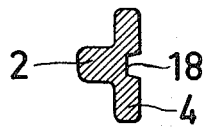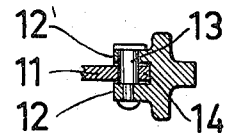

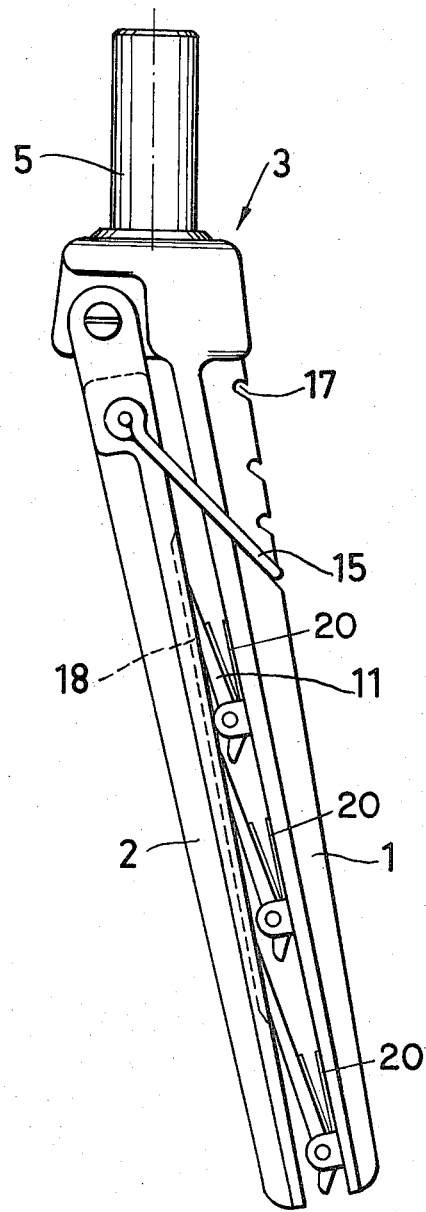

DEVICE FOR TAKING CAUGHT FISH OUT OF THE WATER

This invention relates to a device for taking a fish, which has been caught in one way or another, for example by hook and fishing line, by net or similar fishing tackle, out of the water and it has as its object to bring about such a device of an entirely new type, which replaces the tackles for this purpose at present on the market, such as pole nets, gaffs etc., and which does not show the disadvantages of said tackles. As regards gaff, this tackle is most suitable for great fishes, and the commercially available type of pole nets intended primarily for sport fishing is adapted for small and medium-size fishes. None of these tackles therefore can be used advantageously for both great and small fishes.

The aforesaid object is achieved by the characteristic features of the present invention as they are defined in the claims. A device designed according to the claims for taking caught fish out of the water has at tests proved highly superior to pole nets and gaffs, from a catching point of view as well as because of its possibility to be taken along at fishing under all conditions, and further due to its applicability with equal good result to both small and relatively great fishes.

The invention is described in the following in greater detail by way of only one exemplifying embodiment, with reference to the accompanying drawings, in which FIG. 1 shows a front view of the exemplifying embodiment of the device, FIG. 2 shows a view along the line II—II in FIG. 1, FIG. 3 shows a section along the line III—III in FIG. 1, FIG. 4 shows a section along the line IV—IV in FIG. 1, FIG. 5 shows a section along the line V—V in FIG. 1, and FIGS. 6 and 7 show the device seen from the same direction as in FIG. 1, in a state folded together and, respectively, extended.

At the embodiment selected for exemplifying the invention and shown in the drawings, the device according to the invention comprises two arms or legs designated by 1 and, respectively, 2, one of which is designed integral with or rigidly, i.e. non-movably, connected to a shaft-holder 3, and the second leg 2 is supported pivotally on the shaft-holder 3 so as to enable pivotal movement in relation to the fixed leg 1. In the embodiment shown, the two legs have substantially T-shaped cross-section, as shown in FIG. 4, and are arranged such that the widest surface 4 faces the corresponding wide surface of the other leg. The shaft-holder 3 is formed with a holding means 5 for mounting a shaft (not shown) which may be of a construction per se known, for example telescopically extensible or articulated in several places and thereby foldable. The holding means proper 5 may be formed as a pin, sleeve or in another suitable way. When the shaft end intended for coaction with the holding means is tubular, a pin is to be used as holding means 5. When, however, said shaft end is of rod shape, preferably a sleeve is used as holding means 5. The shaft can be secured by means of a threaded connection, bolted connection or by a split-pin or the like.

The pivotal leg 2 is formed at its end facing the shaft-holder 3 with two spaced lugs 6 provided with bores, and is supported at the shaft-holder 3, which is formed with a portion 7 fitting between the lugs 6 and the leg, by means of an axle, which extends through said portion and said lugs 6, and about which or together with which the leg 2 can be pivoted to and away from the fixed leg 1 within an angular range, which in the embodiment shown is restricted to about 50° but, if necessary, can be increased substantially. Said axle is shown in the Figures in the form of a bolt 8 with nut 9, preferably with an intermediate washer 10. This screw connection is to be tightened so that the pivotally supported leg 2 cannot of its own change its position. It is, thus, possible, by tightening and untightening the screw connection, to adjust the friction between the surfaces of the shaft-holder and legs abutting each other and thereby also to adjust the force required for changing the position of leg 2 in relation to the other leg 1 of the device. Said abutting surfaces may also be provided with friction lining or the like.

The device according to the invention further comprises a plurality of spears or flukes 11 — in the shown embodiment three in number — which are fastened on one of the legs of the device, preferably on the fixed leg 1 as shown in the Figures. Each of said spears 11 is supported pivotally between two lugs 12 on the leg 1 by means of a rivet 13, pin, split-pin or the like. In order to prevent the spears 11 from pivoting too far outwards from the leg 1, the spears are provided with a rearwardly projecting shoulder 14, which is arranged angularly in relation to the spear 11 proper and, abutting the surface 4 of the leg 1, holds the spear in a predetermined position where the angle between the spear and the leg supporting the same shall be less than 90°, i.e. acute. When desired, the spears 11 may be spring-loaded so as always to be returned to and retained with definite load in said predetermined position. In the illustrated embodiment, these springs are shown, for example, as a small leaf or wire spring 20, preferably fastened about the axle 13 supporting the spear.

In the embodiment of the device according to the invention shown in the drawings, the pivotally supported leg 2 is prevented by a locking yoke 15 from swinging outwards more than about 50°. Said yoke surrounds the fixed leg 1 and is pivotally suspended at and on both sides of the leg 2, for example by means of a through pin 16 as shown in FIGS. 1 and 3. The locking yoke 15 is adapted to coact with a plurality of longitudinally spaced recesses 17 provided in and along the fixed leg 1. The number of recesses depends on the number of positions in which the pivotal leg 2 is desired to be locked against further outward swinging. Four such recesses 17 are shown in the drawing. The lowermost recess 17 in leg 1 is so arranged that the locking yoke 15 engaging with this recess holds the two legs 1 and 2 together, i.e. against each other, in which position the spears 11 with their points are located protected in a longitudinal groove 18 in the pivotal leg 2. This position is shown in FIG. 6 and, thus, relates to the transport and storage position of the device. The two intermediately located recesses 17 are adapted for coaction with the locking yoke 15 to lock the leg 2 against swinging outwards from the two normal working positions for taking up or gaffing small or medium-size fishes and, respectively, larger fishes, the position for taking up small and medium-size fishes being shown in FIG. 1. In this position, the two legs 1, 2 of the device should be located substantially symmetric in relation to the line of symmetry of the device i.e. an axial plane through shaft holder 3 designated by 19 in FIG. 1 in order to eliminate unbalance at least in this most usual position. By arranging the leg 1, which in the Figure is shown inclined in relation to the symmetry line 19, so as to be adjustable in relation to the shaft-holder 3, the legs 1 and 2 can be set such that the device is balanced in all working positions. In FIG. 7 the fully open position of the device is shown which renders it possible to release gaffed fish, i.e. the locking yoke 15 engages with the uppermost recess 17 in the leg 1. In this conjunction, it is to be stressed once again that the friction between surfaces of the legs and the shaft-holder abutting each other is such that the leg 2 cannot move freely about its axle, and that the locking yoke in all positions serves as a locking means such as at a pressure on the leg 2 exceeding the friction force between said surfaces to prevent said leg from swinging outwards from the intended position.

The number of spears 11 on one of the legs of the device depends on the length of the legs and, thus, may be greater or lower than three as shown. It is suitable, furthermore, to give the spears 11 different lengths such that, as illustrated the longest spear is located closest to the free end of the leg 1 and the shortest spear is located closest to the shaft-holder 3. The spears 11 are pointed and preferably made of stainless steel, different from the device in general which may be made of a plastic material adapted for compression molding, injection molding or the like, or of some suitable metal. When the device is folded to storage position, the spears 11 are folded upwards against the leg, at which they are pivotally suspended, and drop with their points into the protected position in the longitudinal slot 18 in leg 2.

When the device according to the invention is applied to taking up or gaffing caught fish, the device with the legs 1, 2 set in intended position is lowered from above over the fish so that the fish is placed between the legs. Hereby the spears 11, irrespective whether they are spring-loaded or not, are folded up by the fish. A subsequent upward pull causes one or more spears to be folded out and thereby automatically penetrate into the fish, which thereby is safely locked between the legs. Such penetration is also obtained if the fish tries to get out of the decice before said upward pull could be made. The escape chances for the fish, thus, are very small. After the fish has been lifted up, the leg 2 is swung outwards to the position shown in FIG. 7, and the fish can be taken out of the device.

The present invention is not restricted to the embodiment shown in the drawings and described above, but can be altered and modified in many different ways within the scope of the claims. The device according to the invention in principle can be said to consist of two or more legs, of which at least one shall be provided with a number of spears, which are adapted to be folded upwards and back into a predetermined position and shall be arranged such that the angle between them can be changed within certain definite limits, and that the spears can be set in several different positions and safely be locked in each case against moving further apart in any of these positions.

What I claim is:

1. A device for gaffing caught fish comprising a shaft-holder, a pair of legs mounted on said shaft-holder for pivotal adjustment relative to each other to establish a selected one of a plurality of different operating angular openings therebetween facing in the direction away from said shaft-holder and into which opening the caught fish is to be brought, means for preventing the angle between said legs from exceeding the one selected, and a plurality of spear-like fish penetrating means pivotally connected to and located in longitudinally spaced relation along one of said legs, said plurality of spear-like fish penetrating means extending into the opening between said legs and being spring loaded to an initial stopped position at an acute angle with the leg to which they are connected opening in the direction of said shaft-holder, said plurality of spear-like fish penetrating means being pivotally movable from said stopped position in the direction of said shaft-holder by the caught fish as it is initially gaffed by a downward push on the device and thereafter penetrating the fish by pivotal movement in the opposite direction by an upward pull on the device.

2. A device as defined in claim 1 for gaffing caught fish wherein said plurality of longitudinally spaced spear-like fish penetrating means are of progressively different lengths the longest of which is located at that end of the leg which defines the opening for receiving the caught fish.

3. A device as defined in claim 1 for gaffing caught fish and wherein said means for preventing the angle between said legs from exceeding the selected one is constituted by a locking yoke pivotally mounted on one of said legs and which is engageable with a selected one of a plurality of longitudinally spaced recesses provided along the other leg.

4. A device as defined in claim 1 for gaffing caught fish and wherein said leg with the plurality of longitudinally spaced spear-like fish penetrating means thereon is formed integrally with said shaft-holder.

* * * * *